US009853365B2

(12) United States Patent
Kumar Y. B. et al.

(10) Patent No.: US 9,853,365 B2
(45) Date of Patent: Dec. 26, 2017

(54) DYNAMIC PROGRAMMING OF CHIRPS IN A FREQUENCY MODULATED CONTINUOUS WAVE (FMCW) RADAR SYSTEM

(71) Applicant: Texas Instruments Incorporated, Dallas, TX (US)

(72) Inventors: Chethan Kumar Y. B., Bangalore (IN); Saurabh Khanna, New Delhi (IN); Vijay Rentala, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 269 days.

(21) Appl. No.: 14/704,868

(22) Filed: May 5, 2015

(65) Prior Publication Data
US 2016/0327633 A1  Nov. 10, 2016

(51) Int. Cl.
*H01Q 23/00* (2006.01)
*G01S 13/34* (2006.01)
*G01S 13/00* (2006.01)

(52) U.S. Cl.
CPC .......... *H01Q 23/00* (2013.01); *G01S 13/343* (2013.01)

(58) Field of Classification Search
CPC ......... H01Q 23/00; G01S 13/02; G01S 13/06; G01S 13/08; G01S 13/32; G01S 13/34; G01S 13/343; G01S 7/282; G06F 1/02; G06F 1/03; G06F 1/0321; G06F 1/0328; G06F 1/0335; H03D 7/00; H03B 23/00
See application file for complete search history.

(56) References Cited

U.S. PATENT DOCUMENTS

| | | | |
|---|---|---|---|
| 5,001,660 A * | 3/1991 | Adcock | H03D 7/00 708/270 |
| 5,008,845 A * | 4/1991 | Adcock | H03B 23/00 340/384.7 |
| 5,469,479 A * | 11/1995 | Chang et al. | G01S 7/282 |
| 6,091,356 A * | 7/2000 | Sanders | H03B 23/00 331/1 R |
| 6,614,813 B1 * | 9/2003 | Dudley | G06F 1/0335 370/532 |
| 2007/0152873 A1 | 7/2007 | Hunt | |
| 2009/0251360 A1 | 10/2009 | Uebo | |
| 2010/0289692 A1 | 11/2010 | Winkler | |
| 2016/0187462 A1 * | 6/2016 | Altus | G01S 13/343 342/175 |

OTHER PUBLICATIONS

Jurgen Hasch, et al, "Millimeter-Wave Technology for Automotive Radar Sensors in the 77 GHz Frequency Band", IEEE Transactions on Microwave Theory and Techniques, vol. 60, No. 3, Mar. 2012, pp. 845-860.

(Continued)

*Primary Examiner* — Bernarr E Gregory
(74) *Attorney, Agent, or Firm* — Ronald O. Neerings; Charles A. Brill; Frank D. Cimino

(57) ABSTRACT

A Frequency Modulated Continuous Wave (FMCW) radar system is provided that includes a chirp profile storage component configured to store a chirp profile for each chirp of a frame of chirps and a timing engine coupled to the chirp profile storage component to receive each chirp profile in transmission order during transmission of the frame of chirps, in which the timing engine uses each chirp profile to configure a corresponding chirp.

20 Claims, 7 Drawing Sheets

(56) References Cited

OTHER PUBLICATIONS

Wu Chang, et al, "A Practical FMCW Radar Signal Processing Method and Its System Implementation", 2006 6th International Conference on ITS Telecommunications Proceedings, Jun. 2006, Chengdu, China, pp. 1195-1199.

Hermann Rohling and Cristof Moller, "Radar Waveform for Automotive Radar Systems and Applications", 2008 Radar Conference, May 26-30, 2008, Rome, Italy, pp. 1-4.

Jri Lee, et al, "A Fully-Integrated 77-GHz FMCW Radar Transceiver in 65-nm CMOS Technology", IEEE Journal of Solid-State Circuits, vol. 45, No. 12, December 210, pp. 2746-2756.

\* cited by examiner

DYNAMIC PROGRAMMING OF CHIRPS IN A FREQUENCY MODULATED CONTINUOUS WAVE (FMCW) RADAR SYSTEM

BACKGROUND OF THE DISCLOSURE

Field of the Disclosure

Embodiments of the present disclosure generally relate to Frequency Modulated Continuous Wave (FMCW) radar systems, and more specifically relate to dynamically programming chirps in FMCW radar systems.

Description of the Related Art

Frequency Modulated Continuous Wave (FMCW) automotive radar systems transmit and receive parameterized frequency-modulated signals commonly referred to as chirps. Typical applications of automotive radar systems require that the radar systems transmit a "burst" or sequence of chirps which may be referred to as a "frame" with minimal time gap between the chirps. A programmable digital timing engine configures the transmitted chirps. Typically, the parameter values of a chirp to be transmitted are written by a software program to a set of parameter registers in the timing engine. Due to software latency, chirp parameters may be fixed for a frame, i.e., the chirp parameters are programmed at the beginning of a frame and the timing engine configures each chirp in the frame using these parameters.

In some radar systems, there may be two sets of parameter registers. In such systems, the software may program both sets of registers to pre-configure two different types of chirps. The sequence of chirps transmitted during the frame is then selected based on the value of a counter. For example, the two pre-configured chirps may be transmitted in an alternating fashion based on the counter value being even or odd.

SUMMARY

Embodiments of the present disclosure relate to methods and apparatus for dynamic programming of chirps in an FMCW radar system. In one aspect, a Frequency Modulated Continuous Wave (FMCW) radar system is provided that includes a chirp profile storage component configured to store a chirp profile for each chirp of a frame of chirps and a timing engine coupled to the chirp profile storage component to receive each chirp profile in transmission order during transmission of the frame of chirps, in which the timing engine uses each chirp profile to configure a corresponding chirp.

In one aspect, a method for programming chirps in a frame of chirps in a Frequency Modulated Continuous Wave (FMCW) radar system is provided that includes receiving a chirp profile for each chirp in the frame of chirps in a timing engine of the FMCW radar system in transmission order during transmission of the frame of chirps, in which each chirp profile is received from a chirp profile storage component in the FMCW radar system, and using, by the timing engine, each chirp profile to configure a corresponding chirp.

In one aspect, a Frequency Modulated Continuous Wave (FMCW) radar system is provided that includes a radar front end configured to transmit a frame of chirps in which each chirp in the frame of chirps is configured based on a chirp profile corresponding to the chirp, and in which each chirp in the frame of chirps has a separate corresponding chirp profile, and a processing unit coupled to the radar front end to provide the chirp profile for each chirp to the radar front end in transmission order.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
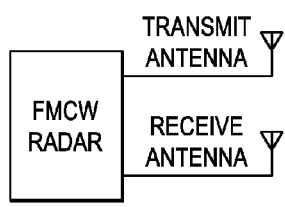
FIGS. 1, 2, 3, and 4 are examples illustrating the operation of a frequency modulated continuous wave (FMCW) radar.

Specific embodiments of the disclosure will now be described in detail with reference to the accompanying figures. Like elements in the various figures are denoted by like reference numerals for consistency.

Figure 2:
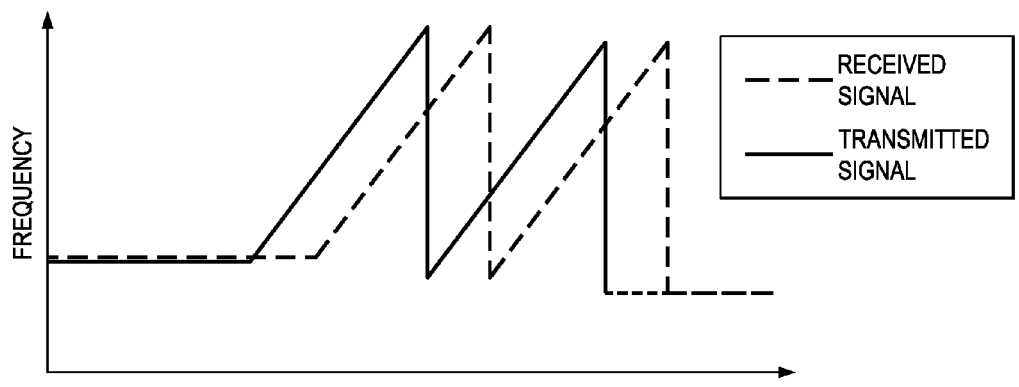

FIGS. 1-4 are simple examples illustrating the operation of a frequency modulated continuous wave (FMCW) radar system. As illustrated in FIGS. 1 and 2, in an FMCW radar system, frequency ramps (also referred to as chirps) are transmitted via a transmit antenna. An FMCW radar may, for example, transmit a 4 Giga-hertz (GHz) bandwidth chirp that ramps from 77 GHz to 81 GHz. Composite radio frequency (RF) signals reflected from the scene in front of the radar are received by a receive antenna and processed to extract the range, velocity, and angle (if multiple receive antennas are present) of objects in the scene.

Figure 3:
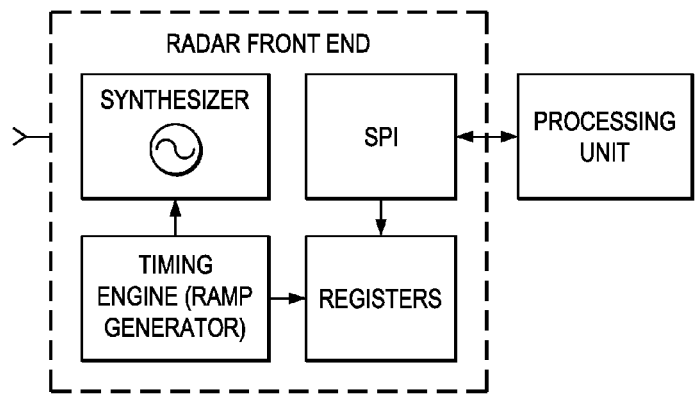

Multiple sequential chirps are typically transmitted in a unit referred to as a frame. As illustrated in FIG. 3, a synthesizer and timing engine in the radar front end of an FMCW radar system operate to generate the chirp signal to be transmitted. The timing engine generates control/configuration signals for chirps based on chirp parameter values stored in the chirp parameter registers and programs the synthesizer according to the desired chirp configurations. The timing engine and the chirp parameter registers are configured by a processing unit via a serial peripheral interface (SPI).

Figure 4:
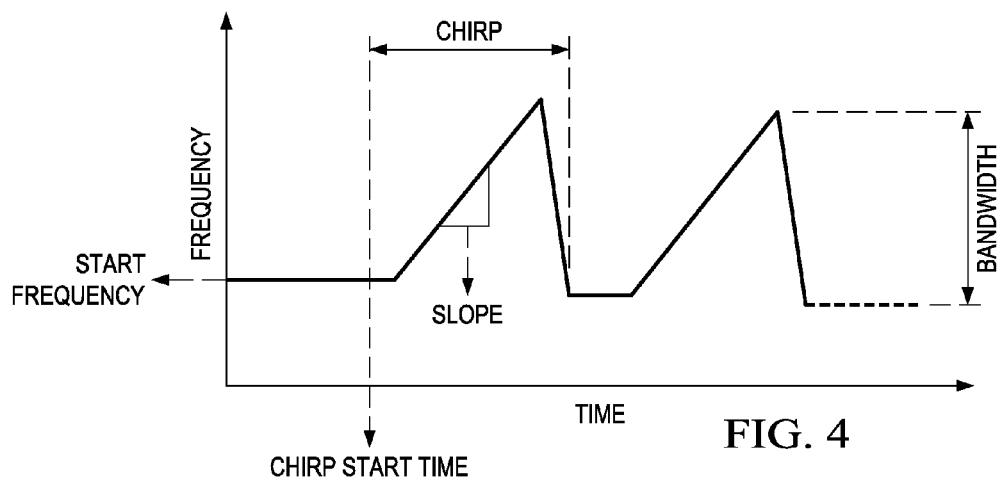

FIG. 4 illustrates some example chirp parameters. Typically, a chirp is configured based on the type of radar application, e.g., short range, mid-range, or long range radar, and the desired range resolution and velocity resolution. Parameters for a chirp may include the start frequency, the start time, the ramp slope, and the bandwidth.

Figure 5:
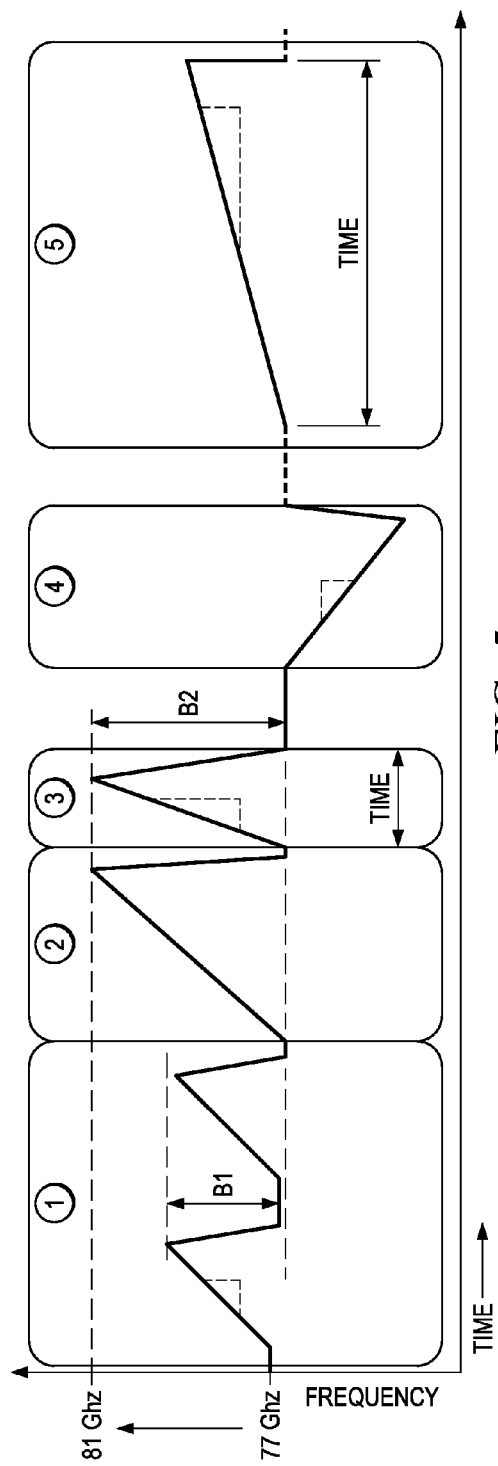
FIG. 5 illustrates some example chirp configurations.

As previously mentioned, in some prior art radar systems, there are one or two sets of parameter registers that are programmed based on the desired chirp configurations. When there is one set of parameter registers, the same chirp configuration is used for all chirps in a frame. If there are two sets of parameter registers, two chirp configurations may be used in a frame based on the value of a counter. FIG. 5 illustrates some example chirp configurations that may be used. Chirp configuration 1 illustrates a typical chirp at a bandwidth B1 that may be repeated multiple times to capture distance, velocity and angle of arrival of objects. Chirp configuration 2 illustrates a chirp with a higher bandwidth B2 than configuration 1, which provides higher accuracy for detecting closer objects at higher range resolutions. Chirp configuration 3 illustrates a chirp with the higher bandwidth B2 and a faster chirping rate than the first two configurations, which provides better velocity resolution for objects. Chirp configuration 4 illustrates a negative slope chirp. Chirp configuration 5 illustrates a configuration for a slow sloping chirp, which provides longer distance information at a poorer range resolution as compared to configurations 2 and 3.

In the prior art, chirp configurations such as these may be applied in different frames, which may result in losing important information about objects within view of the radar due to delays caused by using multiple frames to extract the needed information. Embodiments of the disclosure provide for using multiple chirp profiles in a single frame, which, with an appropriate combination of profiles, may reduce the time needed to extract object information. To accomplish this, chirp parameter registers used by the timing engine are configured in real time from chirp to chirp in a frame. In some embodiments, a chirp processing unit in the radar system, e.g., a field programmable gate array (FPGA) or a microcontroller (MCU), stores chirp timing parameters, i.e., a chirp profile, for each chirp in a frame of chirps. Further, the chirp processing unit transfers the chirp profile for each chirp to the timing engine in real time during transmission of the frame of chirps. Additional parameters, i.e., state configuration parameters, are also provided to the timing engine for configuring various components of the radar front end for transmission of the frame of chirps.

Figure 6:
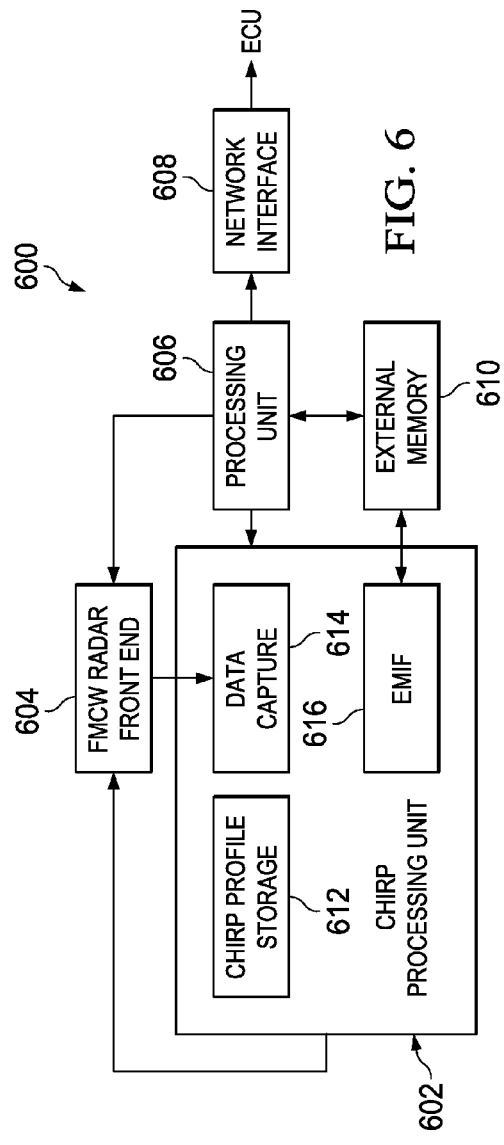
FIG. 6 is a block diagram of an example FMCW radar system configured to use multiple chirp profiles in a single frame.

FIG. 6 is a high level block diagram of an example FMCW radar system configured to use multiple chirp profiles in a single frame. The example FMCW radar system 600 includes an FMCW radar front end 604, a chirp processing unit 602, a processing unit 606, and external memory 610, and a network interface 608. The radar front end 604 includes functionality to transmit and receive a frame of chirps. This functionality may include, for example, one or more transmitters, one or more receivers, a timing engine, a frequency synthesizer, and storage, e.g., registers, for two or more chirp profile buffers. The radar front end 604 may also include a suitable interface or interfaces for receiving data from and transmitting data to the processing unit 606 and the chirp processing unit 602. An interface may be, for example, a serial interface such as a high speed serial interface such as a low-voltage differential signaling (LVDS) interface or a lower speed serial peripheral interface (SPI). A simple example of a radar front end 604 is shown in FIG. 3. The radar front end 604 may be implemented, for example, as a single integrated chip.

The processing unit 606 is coupled to the external memory 610 to receive radar signal data captured from the radar front end 604 during a frame. The processing unit 606 is also coupled to the chirp processing unit 602 to provide chirp profiles and state configuration parameters for the frame of chirps to be transmitted. Chirp profiles and state configuration parameters are explained in more detail below. The processing unit 606 is further coupled to the radar front end 604 to provide control information for the radar front end 604 other than chirp profiles. The processing unit 606 includes functionality to perform complex radar signal processing on radar signal data to determine, for example, distance, velocity, and angle of any detected objects. The processing unit 606 may also include functionality to perform post processing of information about the detected objects, such as tracking objects, determining rate and direction of movement, etc. The processing unit 606 may include any suitable processor or combination of processors as needed for the processing of collected radar data. For example, the processing unit 606 may include a digital signal processor (DSP), a microcontroller (MCU), a System on a Chip (SoC) combining both DSP and MCU processing, or a field programmable gate array (FPGA) and/or a DSP.

The processing unit 606 provides control information as needed to one or more electronic control units in the vehicle via the network interface 608. Electronic control unit (ECU) is a generic term for any embedded system in a vehicle that controls one or more of the electrical system or subsystems in the vehicle. Types of ECU include, for example, electronic/engine control module (ECM), powertrain control module (PCM), transmission control module (TCM), brake control module (BCM or EBCM), central control module (CCM), central timing module (CTM), general electronic module (GEM), body control module (BCM), and suspension control module (SCM).

The network interface 608 may implement any suitable protocol, such as, for example, the controller area network (CAN) protocol, the FlexRay protocol, or Ethernet protocol. The external memory 610 may be any suitable memory design, such as, for example, dynamic random access memory (DRAM) such as synchronous DRAM (SDRAM) or double data rate DRAM (DDR DRAM), flash memory, a combination thereof, or the like.

The chirp processing unit 602 is configured to manage the sequence and type of chirps transmitted during a frame, including providing chirp profiles for each chirp in the frame to the radar front end 604 and capturing the radar signal data generated by the radar front end 604. The chip processing unit 602 may be implemented with any suitable processor, a hardware state machine, or a combination thereof, as needed for real-time management of the chirp related data. For example, the chip processing unit 602 may be a field programmable gate array (FPGA), a microcontroller (MCU), a digital signal processor (DSP), a combination thereof, etc.

The chirp processing unit 602 includes a chirp profile storage component 612, a data capture component 614, and an external memory interface (EMIF) 616. The data capture component 614 includes functionality to capture radar signal data from the radar front end 604 during transmission of a frame of chirps and to store the data in the external memory 610. The EMIF 616 is coupled to the external memory 610 and may be used by the data capture component 614 to store the radar signal data captured during transmission of a frame in the external memory 610.

The chirp processing unit 602 includes functionality to receive chirp profiles for a frame of chirps and to store the chirp profiles in the chirp profile storage component 612. The chirp profile storage component 612 may be any suitable memory design, e.g., registers or the like. The amount of storage provided in the chirp profile storage component 612 is implementation dependent, and may be based on factors such as the maximum chirp frame size, i.e., the maximum number of chirps in a frame, supported by the radar system 600 and the maximum amount of storage needed for a chirp profile.

The chirp processing unit 602 further includes functionality to provide chirp profiles to the timing engine in the radar front end 604 in a round robin fashion. More specifically, the radar front end 604 includes chirp profile buffers, e.g., registers, for storing parameters of chirps to be transmitted. A chirp profile buffer stores parameters for a single chirp. Further, a chirp profile is a set of chirp timing parameters for a single chirp. Chirp profiles are described in more detail below. The number of chirp profile buffers is implementation dependent, and may be based on factors such as the throughput of the chirp processing unit 602 in filling the buffers, the cost to implement the buffers, etc.

The timing engine includes functionality to read chirp parameters in a round robin fashion from the chirp profile buffers during transmission of a frame of chirps. That is, if there are two chirp profile buffers A and B, the timing engine reads chirp parameters from buffer A, the next chirp parameters from buffer B, the next chirp parameters from buffer A, and so on. If there are four chirp profile buffers A, B, C, and D, the timing engine reads chirp parameters from buffer A, the next chirp parameters from buffer B, the next chirp parameters from buffer C, the next chirp parameters from buffer D, the next chirp parameters from buffer A, etc.

Figure 7:
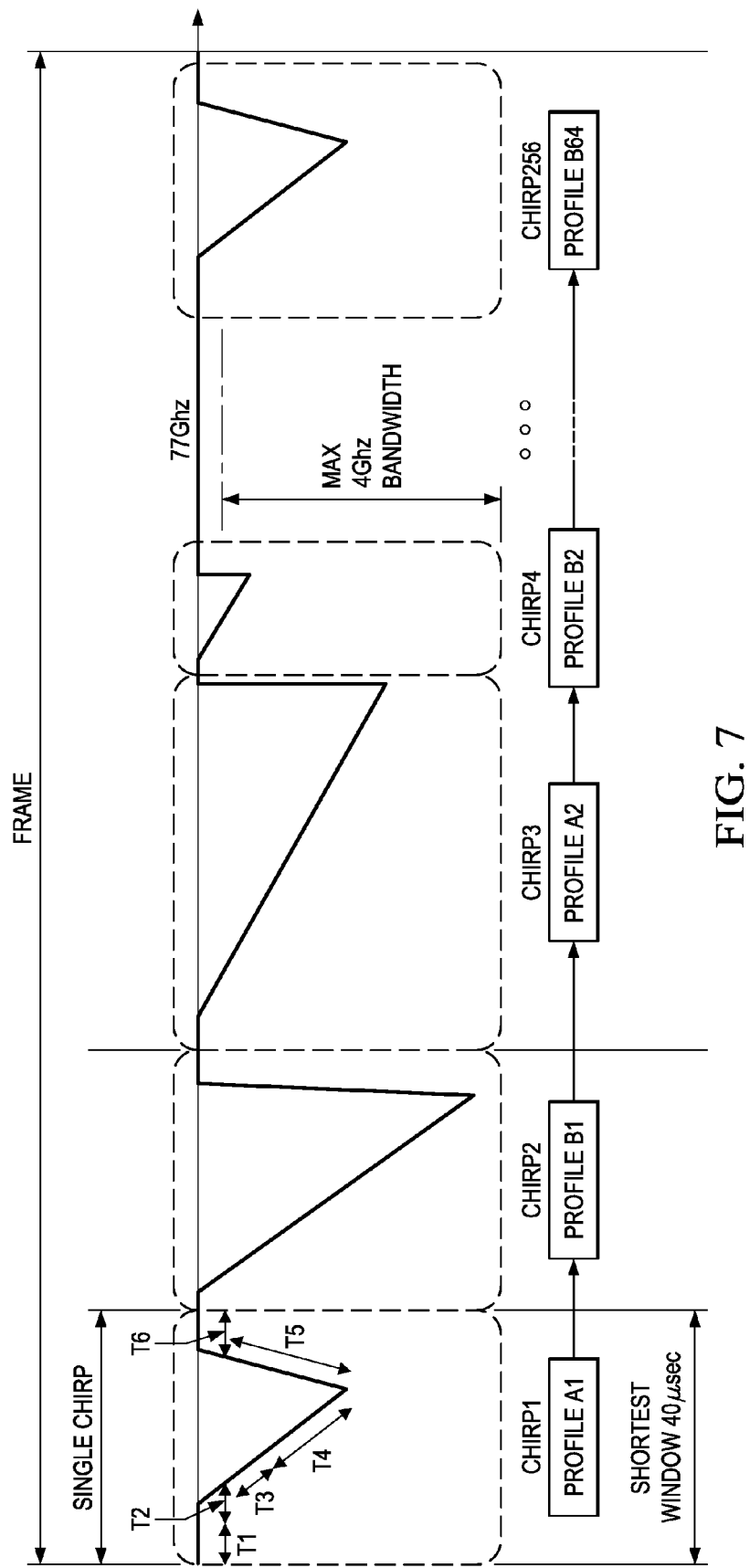
FIGS. 7 and 8 are examples illustrating round robin chirp profile buffer management.

The chirp processing unit 602 includes functionality to move chirp profiles from the chirp profile storage 612 to the chirp profile buffers in a round robin fashion during transmission of a frame of chirps. That is, if there are two chirp profile buffers A and B, while the timing engine reads a chirp profile from buffer A, the chirp processing unit 602 provides the next chirp profile to the timing engine for storage in buffer B and while the timing engine reads a chirp profile from buffer B, the chirp processing unit 602 provides the next chirp profile to the timing engine for storage in buffer A. This pattern is repeated until all chirps in the frame have been transmitted. FIG. 7 is an example illustrating this round robin chirp profile processing for a frame of 256 chirps.

Figure 8:
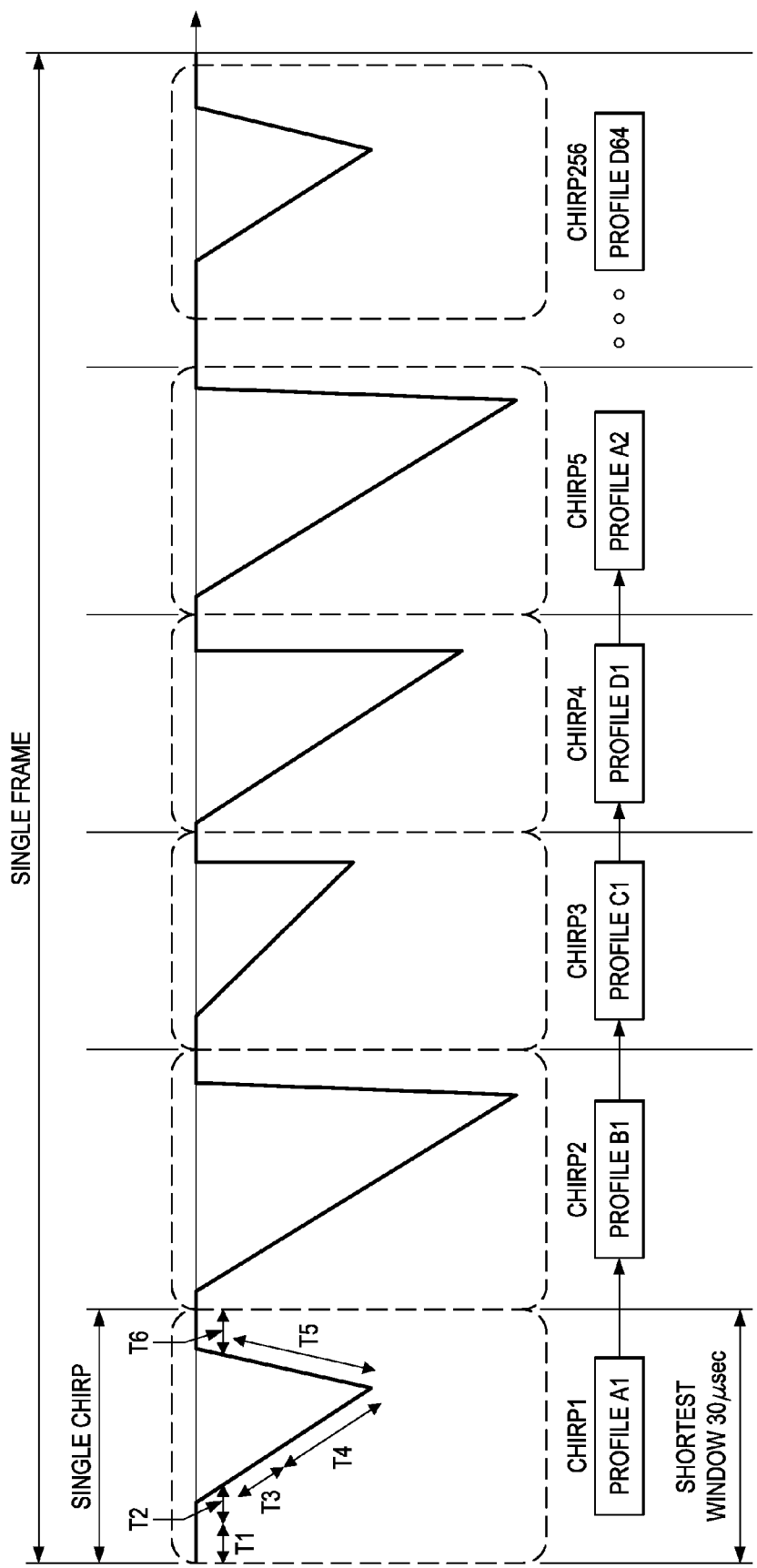

If there are four chirp profile buffers A, B, C, and D, the buffers may be preloaded with chirp parameters for each of the first four chirps in a frame. Then, while the timing engine reads a chirp profile from buffer B, the chirp processing unit 602 provides the fifth chirp profile to the timing engine for storage in buffer A and while the timing engine reads a chirp profile from buffer C, the chirp processing unit 602 provides the sixth chirp profile to the timing engine for storage in buffer B. Further, while the timing engine reads a chirp profile from buffer D, the chirp processing unit 602 provides the seventh chirp profile to the timing engine for storage in buffer C and while the timing engine reads a chirp profile from buffer A, the chirp processing unit 602 provides the eighth chirp profile to the timing engine for storage in buffer D. This pattern is repeated until all chirps in the frame have been transmitted. FIG. 8 is an example illustrating this round robin chirp profile processing for a frame of 256 chirps. Using more than two chirp profile buffers may provide additional flexibility in receiving chirp profiles in the timing engine when an interface such as a serial peripheral interface is used. If the amount of time needed to receive a chirp profile is greater than a chirp time period, then the completion of the write could delay the next chirp. With additional buffers, the timing engine has more time to execute chirps without possible over writing of buffer content.

Figure 9:
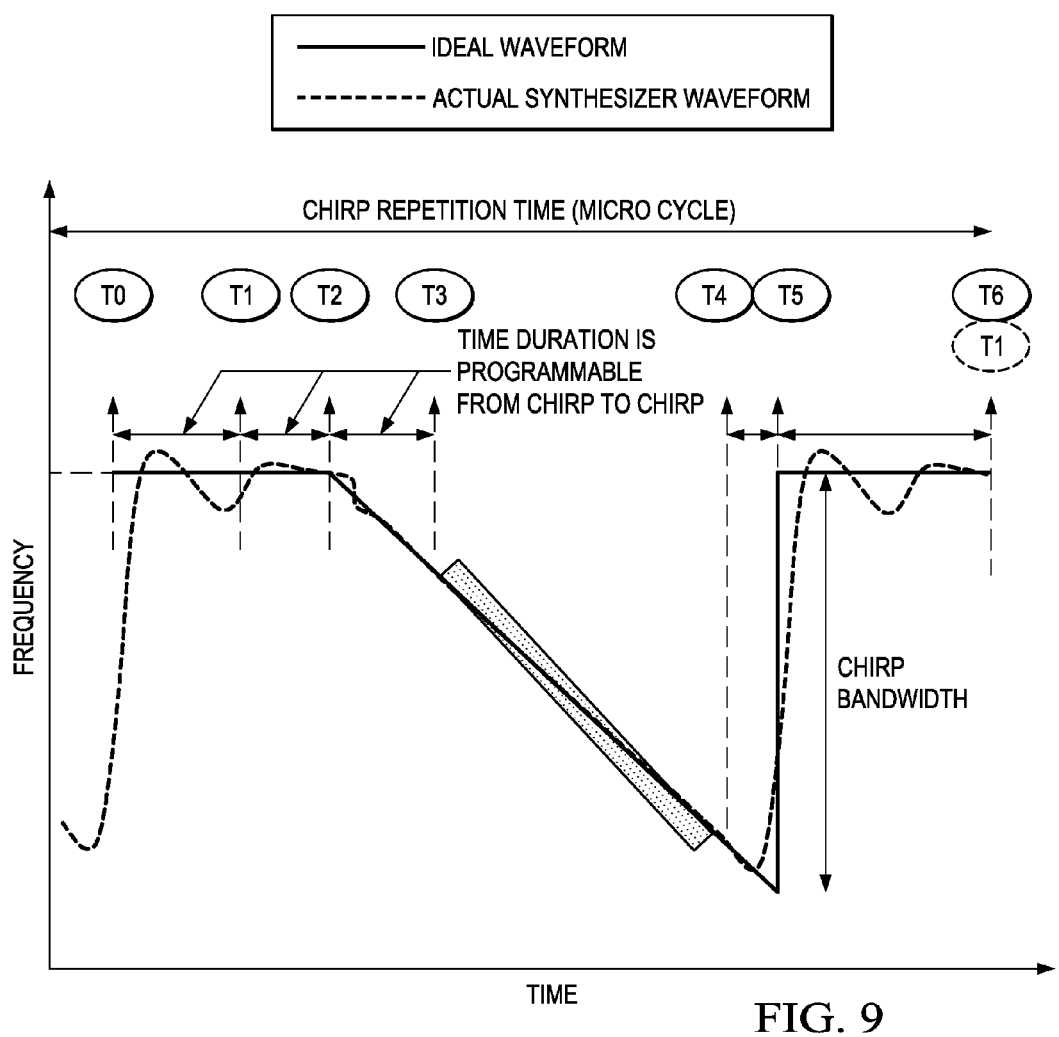
FIG. 9 is an example illustrating the timing cycle of a chirp divided into six time intervals.

Chirp profiles are now explained in more detail. A chirp profile is a set of timing parameters for the timing engine in the radar front end 604. The cycle time of a single chirp, which may be referred to as a micro-cycle or a chirp cycle herein, is divided into time intervals and the beginning of each time interval is set by a timing parameter. Further, the actions performed by the timing engine during each time interval, e.g., start chirp, start radar data sampling, stop radar data sampling, etc., are defined. The number of time intervals and the actions performed during an interval are implementation dependent. For simplicity of explanation, six time intervals with timing parameters T1, T2, T3, T4, T5, and T6 are assumed. FIG. 9 is an example illustrating a micro-cycle with six time intervals. The duration of each interval, i.e., the values of the timing parameters T1, T2, T3, T4, T5, and T6, is programmable from chirp to chirp.

The timing parameter values for a chirp, i.e., the chirp profile, may be determined from the values of various chirp configuration parameters. The number and types of chirp configuration parameters is implementation dependent, i.e., depends on the particular architecture of the radar system 600. Example chirp configuration parameters include a transmitter enable parameter for indicating which transmitters are to be enabled for a chirp, a starting frequency parameter for specifying the initial frequency of a chirp, a ramp slope parameter for specifying the slope of the frequency ramp of a chirp, a parameter for specifying when the radar signal data is initially valid for a chirp, a parameter specifying the number of radar signal data samples to capture, a parameter specifying the time between chirps, frequency synthesizer configuration parameters, and transceiver configuration parameters.

Figure 10:
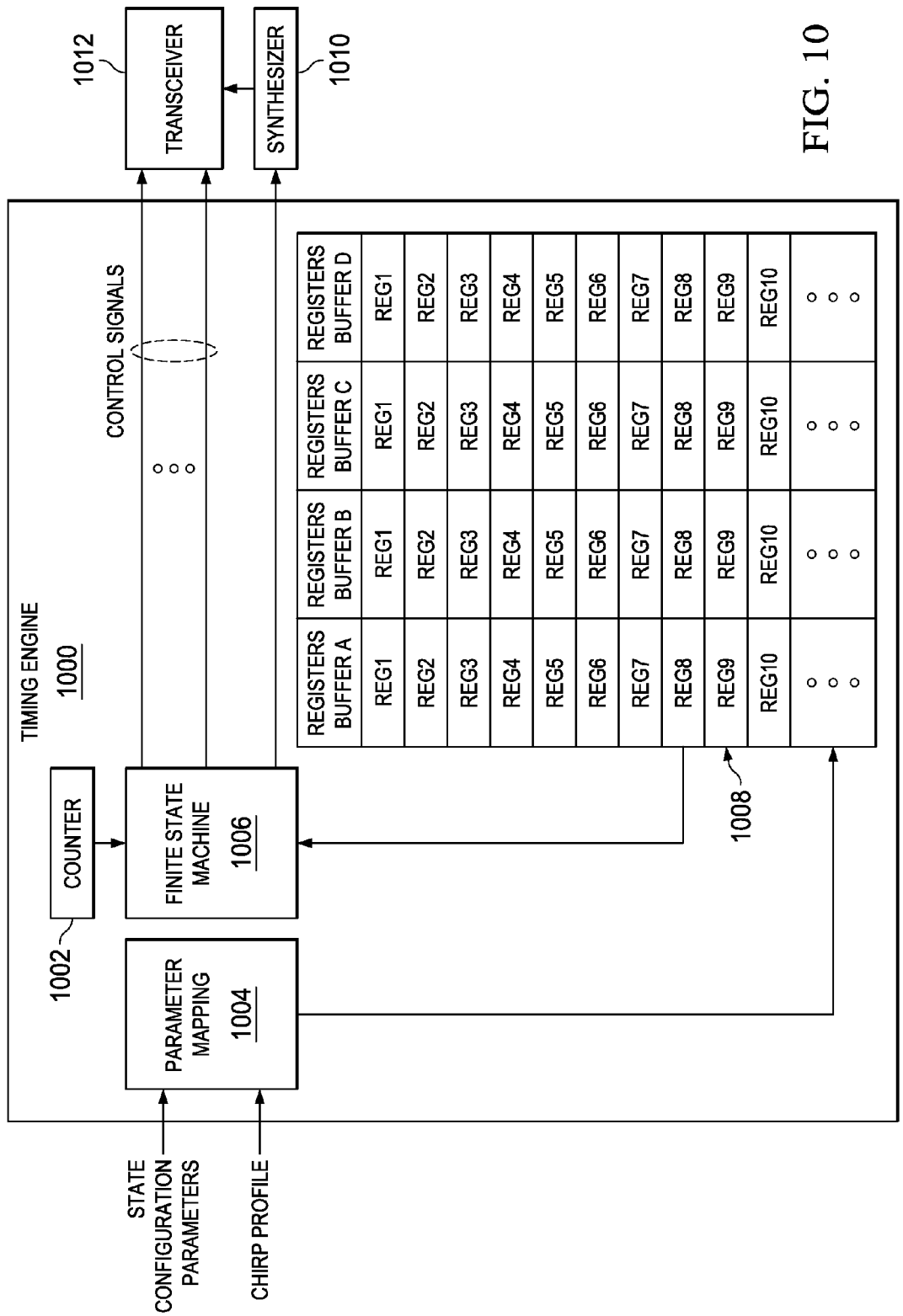
FIG. 10 is a block diagram of an example timing engine configured to operate using chirp profiles.

The timing engine translates the timing parameter values for a chirp into multiple device register writes that control the actions to be taken during each time interval. FIG. 10 shows a block diagram of an example timing engine 1000 configured to operate using chirp profiles. The timing engine 1000 includes a parameter mapping component 1004, a finite state machine 1006, a counter 1002, and chirp profile buffers 1008. Each of the buffers 1008 is a distinct set of registers used to store chirp data that controls the state of the synthesizer 1010 and the transceiver component 1012 in generating a chirp. The number of registers in a buffer and the data stored in each register is implementation dependent. For simplicity of explanation, four buffers of ten registers each are assumed.

The parameter mapping component 1004 receives chirp profiles and state configuration parameters for each chirp in a frame and maps the parameter values to registers in buffers 1008 in a round robin fashion. State configuration parameters are provided by the processing unit 606 and may include, for example, transmit antenna select, receiver bandwidth, etc. The finite state machine 1006 reads the chirp profile buffers 1008 in a round robin fashion and outputs control signals that control the state of the transceiver (or transceivers) in the transceiver component 1012 and the synthesizer 1010. Reading and writing chirp profile buffers in a round robin fashion is previously explained herein.

The counter 1002, which is reset for each micro-cycle, is used by the finite state machine 1006 to initiate actions for each of the time intervals at times corresponding to the timing parameters in the chirp profile. The finite state machine 1006 is clocked by a high speed reference clock and the counter 1002 is incremented at each rising clock signal edge. The use of this counter is explained in more detail in reference to Table 1 and the example of FIG. 11.

Figure 11:
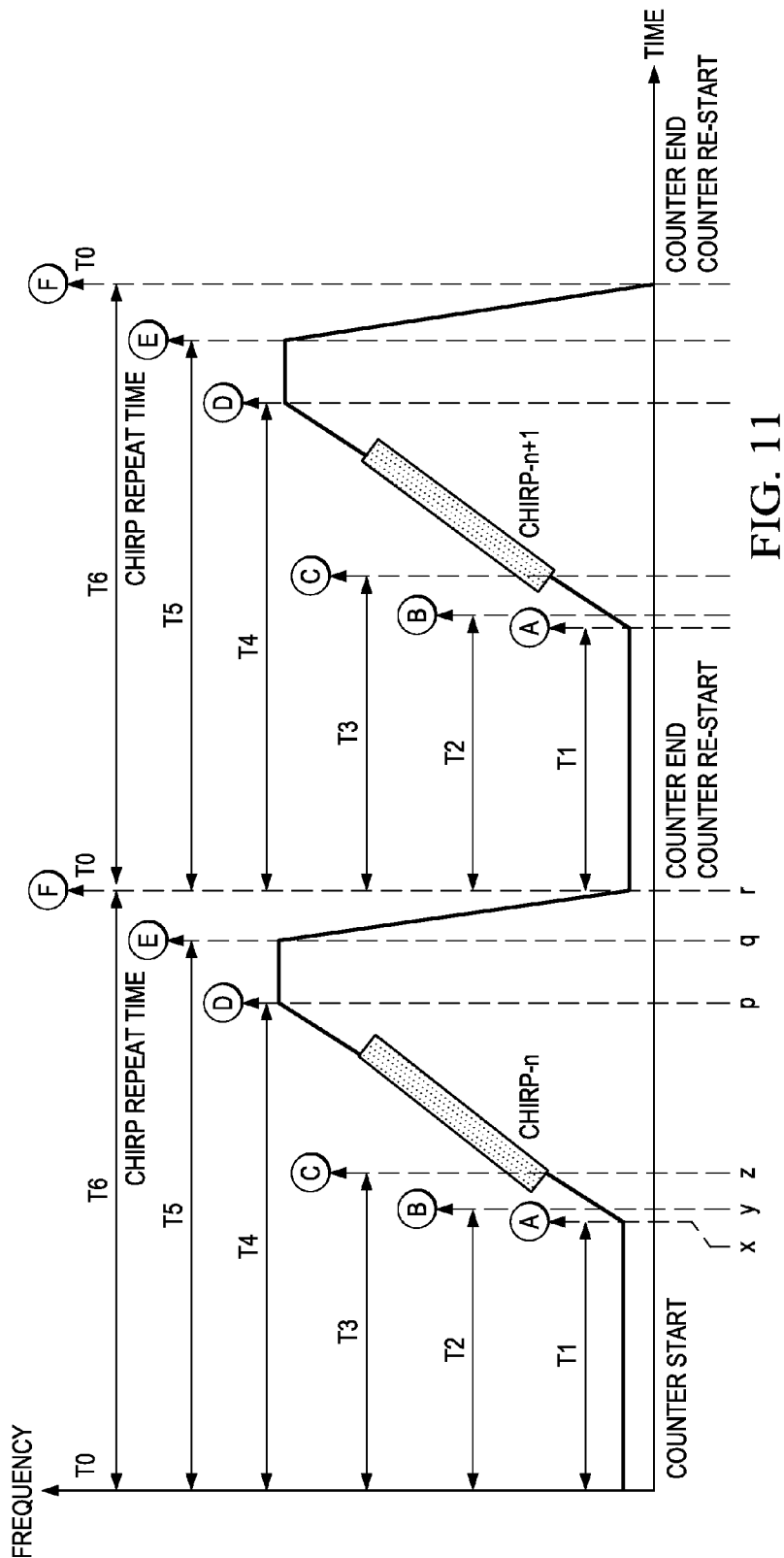
FIG. 11 is an example illustrating the timing control of the finite state machine of the timing engine of FIG. 10.

The example of FIG. 11 and Table 1 illustrate the operation of the timing engine 1000 based on the timing parameters and state configuration parameters. As shown in Table 1, each of the six timing parameters is translated to a counter value. Further, a particular action is associated with each of the timing parameters, and particular registers in registers 1-8 in a chirp profile buffer 1008 are associated with each action. The state configuration parameters are translated to transceiver configuration values that are stored in registers 9 and 10.

TABLE 1

| Parameters | Counter value | Action taken | Associated Registers |
|---|---|---|---|
| T1 | X | A | Reg1, Reg2 |
| T2 | Y | B | Reg3, Reg4 |
| T3 | Z | C | Reg5 |
| T4 | P | D | Reg6 |
| T5 | Q | E | Reg7 |
| T6 | R | F | Reg8 |
| State Config Parameters | — | Transceiver Configuration | Reg9 Reg 10 . . . |

FIG. 11 is an example illustrating the timing control of the finite state machine 1006 within a chirp/micro-cycle. As shown in FIG. 11, a micro-cycle begins at counter value T0 (assumed to be 0). In the time interval between T0 and T1, actions such as configuring the radar transceiver(s), setting the base frequency, and enabling the transmitter(s) may be performed. When the counter value reaches value X (T1), action A is initiated. Action A may be, for example, setting the chirp bandwidth and starting the frequency ramp. When the counter value reaches value Y (T2), action B is initiated. Action B may be, for example, starting the transmitter (or transmitters). When the counter value reaches value Z (T3), action C is taken. Action C may be, for example, initiating the start of radar signal data capture and specifying how many samples to be captured. When the counter value reaches value P (T4), action D is taken. Action D may be, for example, stopping the frequency ramp. The transmitter(s) may also be disabled at this point in time. When the counter value reaches value Q (T5), action E is taken. Action E may be, for example, starting the ramp back of the frequency to the base frequency. When the counter value reaches value R (T6), action F is taken. Action F may be, for example, initializing the state machine for the next chirp.

Figure 12:
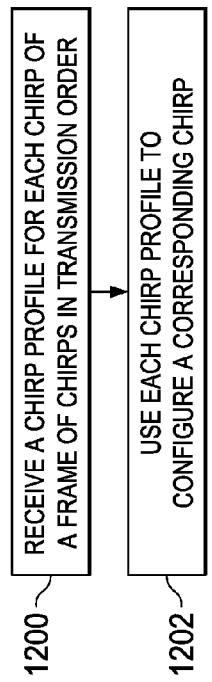
FIG. 12 is a flow diagram of a method for programming chirps in a frame of chirps in an FMCW radar system.

FIG. 12 is a flow diagram of a method for dynamically programming chirps in a frame of chirps in an FMCW radar system such as, for example, the FMCW radar system of FIG. 6. As previously mentioned, a separate chirp profile for each chirp in the frame of chirps is stored in a chirp profile storage component of a chirp processing unit in the radar system. As the frame of chirps is transmitted, a timing engine receives 1200 a chirp profile for each chirp from the chirp processing unit in transmission order and uses 1202 each chirp profile to configure a corresponding chirp. The timing engine includes register buffers, i.e., chirp profile buffers, which are used by the timing engine in round robin order to configure successive chirps. The chirp timing parameters in each received chirp profile are mapped to registers in a chirp profile buffer. The particular chirp profile buffer used for mapping a receive chirp profile is selected in round robin order. The receiving and mapping of a chirp profile to a chirp profile buffer occurs concurrently with using a different chirp profile buffer to configure a chirp.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the processing unit and the chirp processing unit are separate processing units. One of ordinary skill in the art will understand embodiments in which a single processing unit may be used instead of separate processing units. That is, the chirp processing unit and the processing unit may be the same processing unit.

In another example, embodiments have been described herein in which the chirp processing unit also performs radar signal data capture. One of ordinary skill in the art will understand embodiments in which the data capture is performed elsewhere, e.g., by the processing unit.

In another example, one of ordinary skill in the art will understand embodiments in which the radar front end, the chirp processing unit, and the processing unit are integrated in a single chip.

In another example, embodiments have been described herein in which the timing engine services the chirp profile buffers in round robin order. One of ordinary skill in the art will understand embodiments in which, when there are more than two chirp profile buffers, the number and choice of buffers to be serviced and/or the order in which the buffers are serviced is programmable.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A Frequency Modulated Continuous Wave (FMCW) radar system comprising:
   a chirp profile storage component configured to store a chirp profile for each chirp of a frame of chirps, wherein each chirp profile comprises a respective set of parameters;
   a plurality of chirp profile buffers in which each chirp profile buffer includes a plurality of registers;
   a parameter mapping component coupled to the chirp profile storage component and configured to map each chirp profile to respective registers of the plurality of chirp profile buffers; and
   a timing circuit configured to receive each chirp profile from the plurality of chirp profile buffers in transmission order during transmission of the frame of chirps from the FMCW radar system to provide control signals to produce each respective chirp.

2. The FMCW radar system of claim 1, wherein said each respective set of parameters comprises timing parameters associated with at least one timing control action of the timing circuit.

3. The FMCW radar system of claim 1, in which the parameter mapping component is configured to select a chirp profile buffer from the plurality of chirp profile buffers for mapping chirp timing parameters of a chirp profile, in which chirp profile buffer selection is in an order selected from a group consisting of round robin order and programmable order.

4. The FMCW radar system of claim 1, wherein the timing circuit comprises:
- a finite state machine coupled to receive said each chirp profile; and
- a counter configured to sequentially produce a plurality of timing parameters of said each chirp profile from the finite state machine.

5. The FMCW radar system of claim 1, in which the parameter mapping component is configured to map a plurality of chirp timing parameters in a chirp profile to registers in a first chirp profile buffer of the plurality of chirp profile buffers while the timing circuit is using a second chirp profile buffer of the plurality of chirp profile buffers to provide control signals to produce a chirp.

6. The FMCW radar system of claim 1, comprising:
- a transceiver coupled to receive the control signals from the timing circuit; and
- a frequency synthesizer configured to apply FMCW signals for said each respective chirp to the transceiver.

7. The FMCW radar system of claim 1, wherein each chirp profile comprises a respective initial frequency and a frequency ramp slope.

8. A method for programming chirps in a frame of chirps in a Frequency Modulated Continuous Wave (FMCW) radar system, the method comprising:
- receiving a chirp profile for each chirp in the frame of chirps in a timing engine of the FMCW radar system in transmission order during transmission of the frame of chirps, in which each chirp profile is received from a chirp profile storage component in the FMCW radar system;
- mapping a set of chirp timing parameters of each chirp profile to respective registers in a chirp profile buffer selected from a plurality of chirp profile buffers; and
- using, by the timing engine, each chirp profile to produce a corresponding chirp.

9. The method of claim 8, wherein each set of chirp timing parameters is associated with at least one timing control action of the timing engine.

10. The method of claim 8, comprising:
- selecting said each chirp profile from the respective registers by a finite state machine; and
- producing in sequence the timing parameters of said each chirp profile from the finite state machine in response to a counter.

11. The method of claim 8, in which a chirp profile buffer is selected from the plurality of chirp profile buffers in an order selected from a group consisting of round robin order and programmable order.

12. The method of claim 8, in which chirp timing parameters of a received chirp profile are mapped to registers in a first chirp profile buffer of the plurality of chirp profile buffers while the timing engine is using a second chirp profile buffer of the plurality of chirp profile buffers for configuring a chirp.

13. The method of claim 8, applying control signals from the timing engine in response to said each chirp profile to a transceiver to configure the corresponding chirp.

14. The method of claim 8, wherein said each chirp profile comprises a respective initial frequency and a frequency ramp slope.

15. A Frequency Modulated Continuous Wave (FMCW) radar system comprising:
- a radar transceiver configured to transmit a frame of chirps in which each chirp in the frame of chirps is produced based on a respective chirp profile comprising respective parameters;
- a plurality of chirp profile buffers in which each chirp profile buffer includes a plurality of registers;
- a parameter mapping component coupled to receive each chirp profile and configured to map a set of chirp timing parameters in said each chirp profile to registers in a respective chirp profile buffer of the plurality of chirp profile buffers; and
- a processing unit configured to provide the respective chirp profile for each chirp to the parameter mapping component.

16. The FMCW radar system of claim 15, in which the FMCW radar system includes a chirp profile storage component coupled to the processing unit and configured to store the chirp profiles for the frame of chirps.

17. The FMCW radar system of claim 15, wherein the respective parameters comprise timing parameters associated with at least one timing control action of a respective chirp.

18. The FMCW radar system of claim 15, comprising a frequency synthesizer configured to apply FMCW signals for said each chirp to the radar transceiver.

19. The FMCW radar system of claim 15, in which the parameter mapping component is configured to select a chirp profile buffer from the plurality of chirp profile buffers for mapping chirp timing parameters of a chirp profile, in which chirp profile buffer selection is in an order selected from a group consisting of round robin order and programmable order.

20. The FMCW radar system of claim 15, wherein said each chirp profile comprises a respective initial frequency and a frequency ramp slope.

* * * * *